United States Patent [19]
Brophy

[11] Patent Number: 5,664,621
[45] Date of Patent: Sep. 9, 1997

[54] PRE-STRESSED MEMBRANE BASKET COVER ASSEMBLY

[75] Inventor: Mark E. Brophy, Wellsville, N.Y.

[73] Assignee: ABB Air Preheater, Inc., Wellsville, N.Y.

[21] Appl. No.: 703,512

[22] Filed: Aug. 27, 1996

[51] Int. Cl.$^6$ ........................................... F23L 15/02
[52] U.S. Cl. .......................... 165/8; 165/6; 165/4
[58] Field of Search .................... 165/4, 6, 8, 9

[56] References Cited

U.S. PATENT DOCUMENTS

| | | | |
|---|---|---|---|
| 4,561,492 | 12/1985 | Bellows | 165/8 |
| 4,739,822 | 4/1988 | Mergler | 165/8 X |
| 5,119,885 | 6/1992 | Johnson | 165/8 |

FOREIGN PATENT DOCUMENTS 1371809  10/1974  United Kingdom ............. 165/8

Primary Examiner—John Rivell
Assistant Examiner—Christopher Atkinson
Attorney, Agent, or Firm—Chilton, Alix & Van Kirk

[57] ABSTRACT

A rotary regenerative air preheater has heat exchange baskets which contain the mass of heat absorbent material commonly comprised of stacked plate-like elements. The heat exchange basket comprises a frame which is open on each end and which is closed on the sides by basket cover assemblies. Each basket cover assembly includes a light gauge membrane which is welded to the interior surface of the basket cover. Shrinkage of the membrane due to the weld imposes a pre-tension on the membrane which resists deformation of the cover assembly by the heat exchange elements.

9 Claims, 4 Drawing Sheets

PRE-STRESSED MEMBRANE BASKET COVER ASSEMBLY

BACKGROUND OF THE INVENTION

The present invention relates generally to rotary heat exchangers and, more specifically, to heat exchange baskets for such rotary heat exchangers.

A rotary regenerative heat exchanger is employed to transfer heat from one hot gas stream, such as a flue gas stream, to another cold gas stream, such as combustion air. The rotor contains a mass of heat absorbent material which is first positioned in a passageway for the hot gas stream where heat is absorbed by the heat absorbent material. As the rotor turns, the heated absorbent material enters the passageway for the cold gas stream where the heat is transferred from the absorbent material to the cold gas stream.

In a typical rotary heat exchanger, such as a rotary regenerative air preheater, the cylindrical rotor is disposed on a central rotor post and divided into a plurality of sector-shaped compartments by a plurality of radial partitions, known as diaphragms, extending from the rotor post to the outer peripheral shell of the rotor. These sector shaped compartments are loaded with modular heat exchange baskets which contain the mass of heat absorbent material commonly comprised of stacked plate-like elements.

The conventional heat exchange basket comprises a frame which is open on each end and which has side walls which may have covers. The baskets are subject to radial deformation between the hot and the cold faces of the basket and along the chord width of the outboard basket cover. This deformation is caused by the element packing pressure. Such deformation can become a problem when tight dimensional tolerances are required for basket installation into the compartments. In addition, such deformation may cause interference between adjacent baskets or with the rotor structure. Where such deformation is unacceptable, conventional baskets utilize frame components and covers have been fabricated from heavier gauge materials to resist the force exerted by the heat exchange elements. Such basket structure adds excess weight to the rotor and compromises heat transfer surface area.

SUMMARY OF THE INVENTION

The present invention relates to novel means for limiting the deformation of the cover for the heat exchange basket. More specifically, a light gauge membrane is welded to the interior surface of the cover. The shrinkage caused by the weld pattern between the cover and the membrane causes the membrane to be pre-stressed in tension. The pre-stressed membrane resists deformation of the basket cover assembly.

DESCRIPTION OF THE PREFERRED EMBODIMENT

Figure 1:
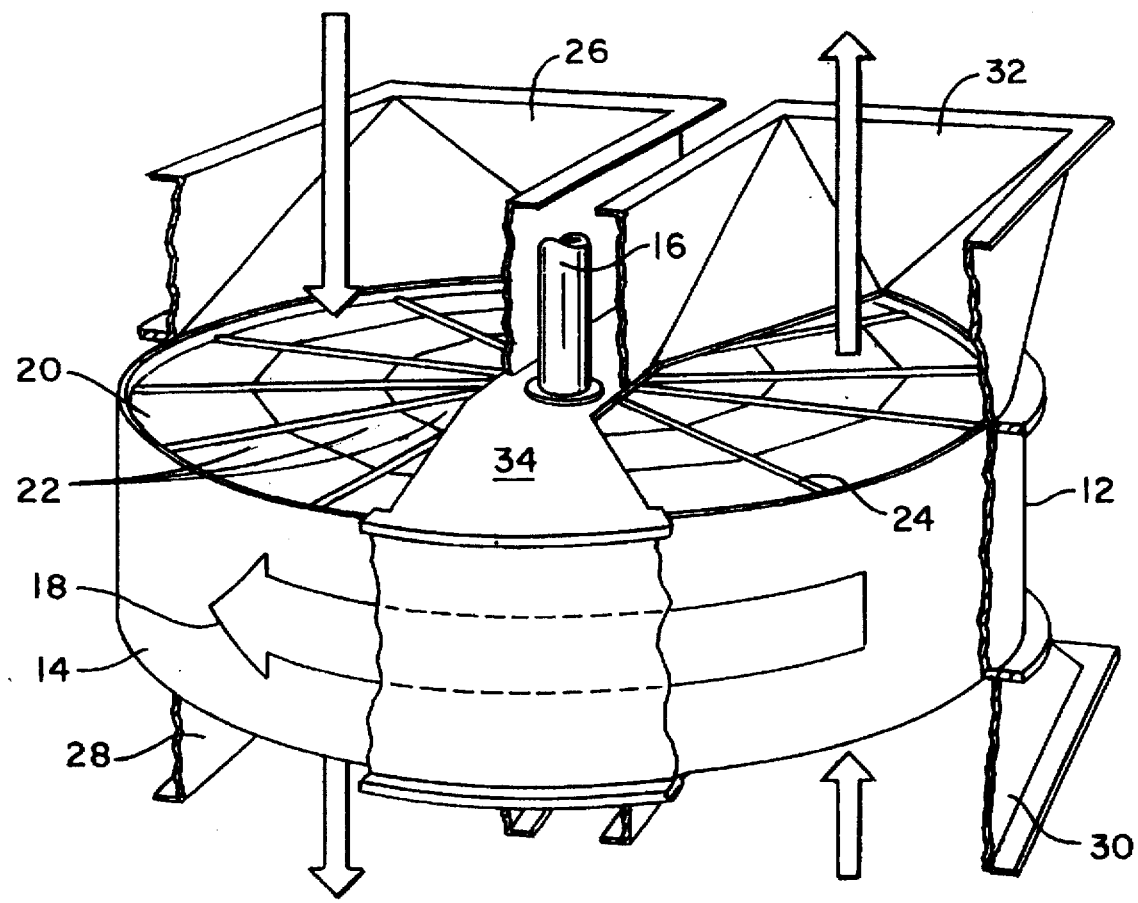
FIG. 1 is a general perspective view of a rotary regenerative air preheater.

FIG. 1 of the drawings is a partially cut-away perspective view of a typical air heater showing a housing 12 in which the rotor 14 is mounted on drive shaft or post 16 for rotation as indicated by the arrow 18. The rotor is composed of a plurality of sectors 20 with each sector containing a number of basket modules 22 and with each sector being defined by the diaphragms 24. The basket modules 22 contain the heat exchange surface. The housing 12 is divided by means of the flow impervious sector plate 34 into a flue gas side and an air side. A corresponding sector plate is also located on the bottom of the unit. The hot flue gases enter the air heater through the gas inlet duct 26, flow through the rotor 14 where heat is transferred to the rotor 14 and then exit through gas outlet duct 28. The countercurrent flowing air enters through air inlet duct 30, flows through the rotor 14 where it picks up heat and then exits through air outlet duct 32.

Figure 2:
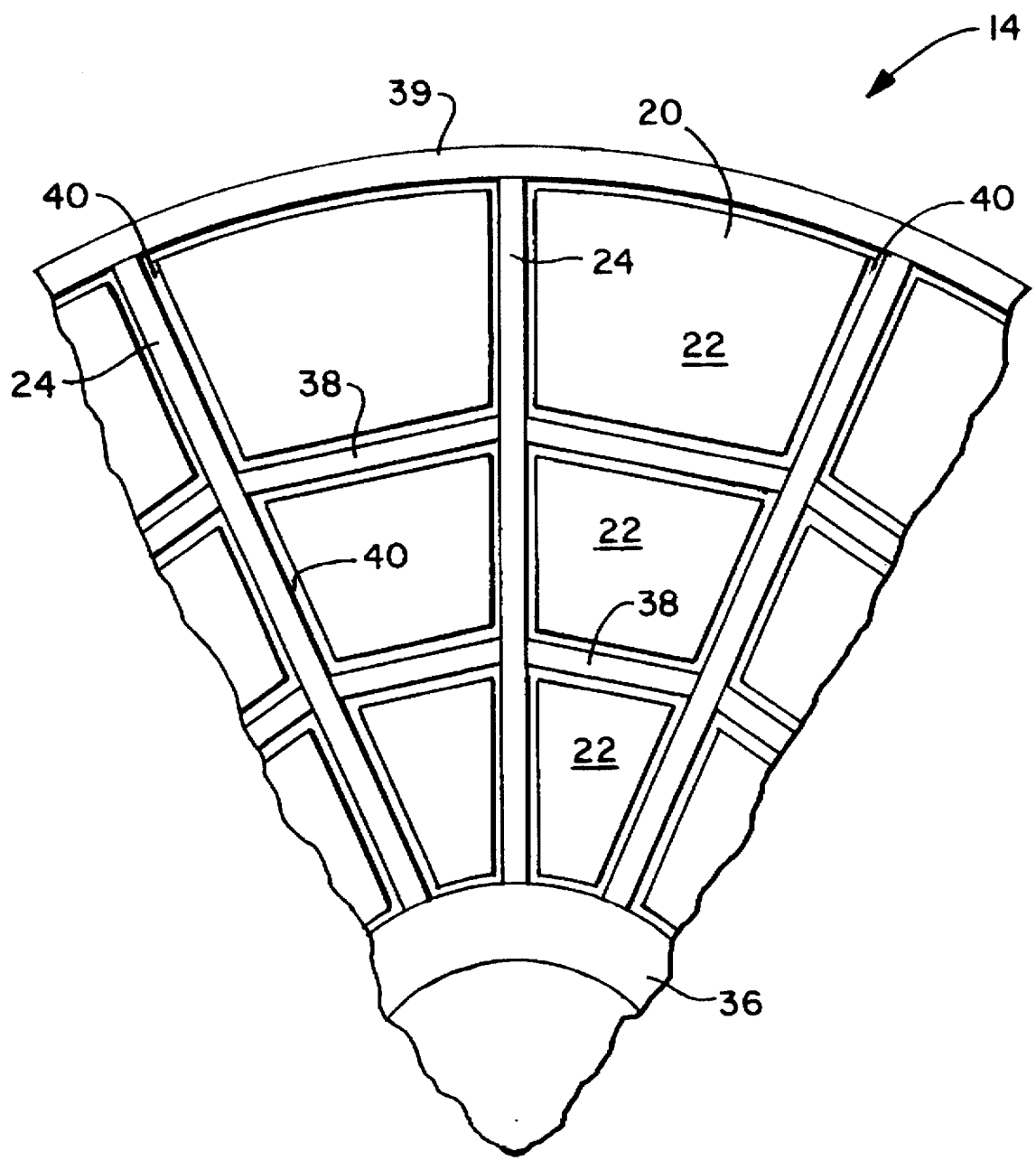
FIG. 2 is a top plan view of a portion of the rotor of a preheater illustrating one level of baskets in position between diaphragms.

Referring now to FIG. 2 which shows a plan view of a portion of a rotor 14, the diaphragms 24 are shown extending radially between the central portion 36 of the rotor and the rotor shell 39. Extending between the diaphragms 24 can be the stay plates 38 which are welded to the diaphragms 24. These stay plates 38 divide each sector 20 into a plurality of radially adjacent basket compartments 40. The basket modules 22 can be loaded into the rotor axially down into each compartment and sitting on top of each other. Such basket modules 22 may also be loaded radially.

Figure 3:
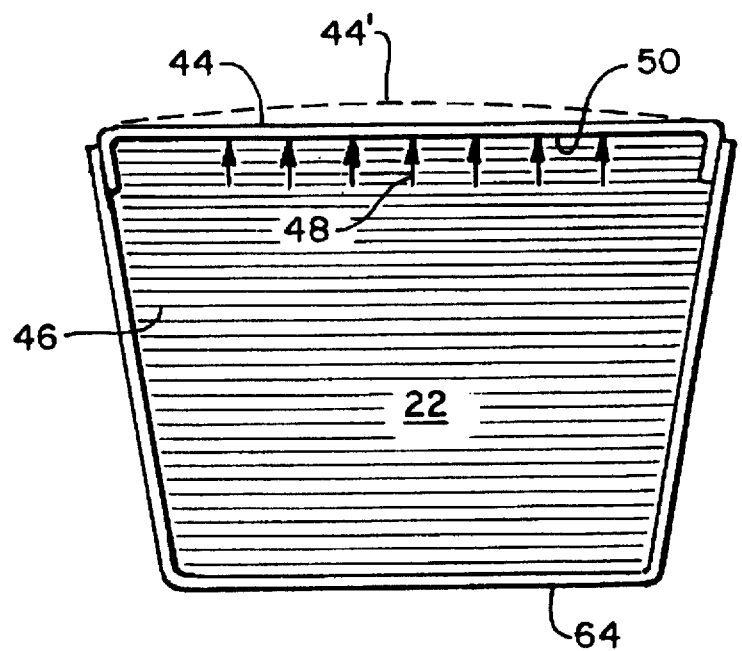
FIG. 3 is a top plan view of a heat exchange basket according to the prior art, showing the deformation of the cover due to packing pressure.
Figure 4:
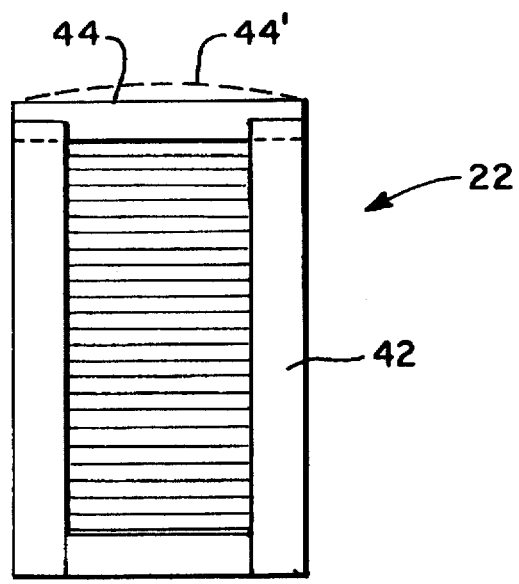
FIG. 4 is a side view of the heat exchange basket of FIG. 3.

With reference to FIGS. 3 and 4, prior art heat exchange baskets 22 generally comprise a frame 42 which is open on each end. Covers 44 are mounted to the sides of the frame 42. Element packing pressure illustrated by tie arrows 48, exerted by the heat exchange elements 46 contained within the basket 22, acts on the inside surface 50 of the cover, especially on the outboard basket cover 44, causing the covers to bow outward to a position illustrated by the dotted lines 44'. Such deformation can become a problem when tight dimensional tolerances are required for basket installation into the compartments 40. In addition, such deformation may cause interference between adjacent baskets or with the rotor structure.

Figure 5:
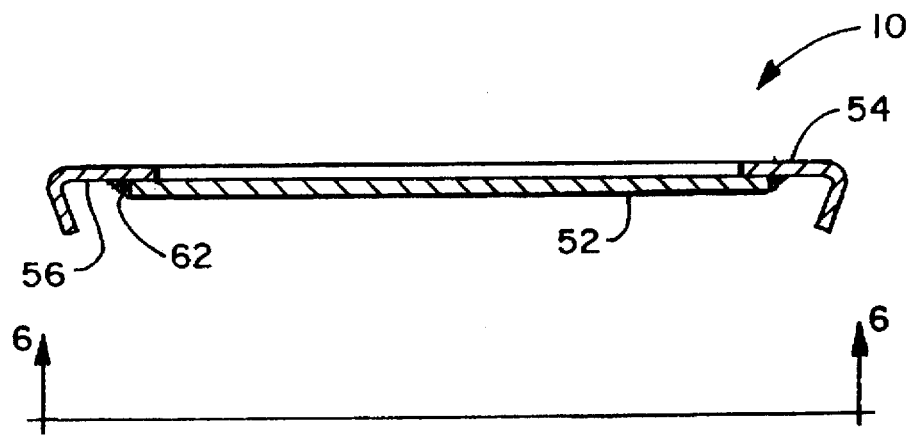
FIG. 5 is section view of a basket cover assembly in accordance with the invention.
Figure 6:
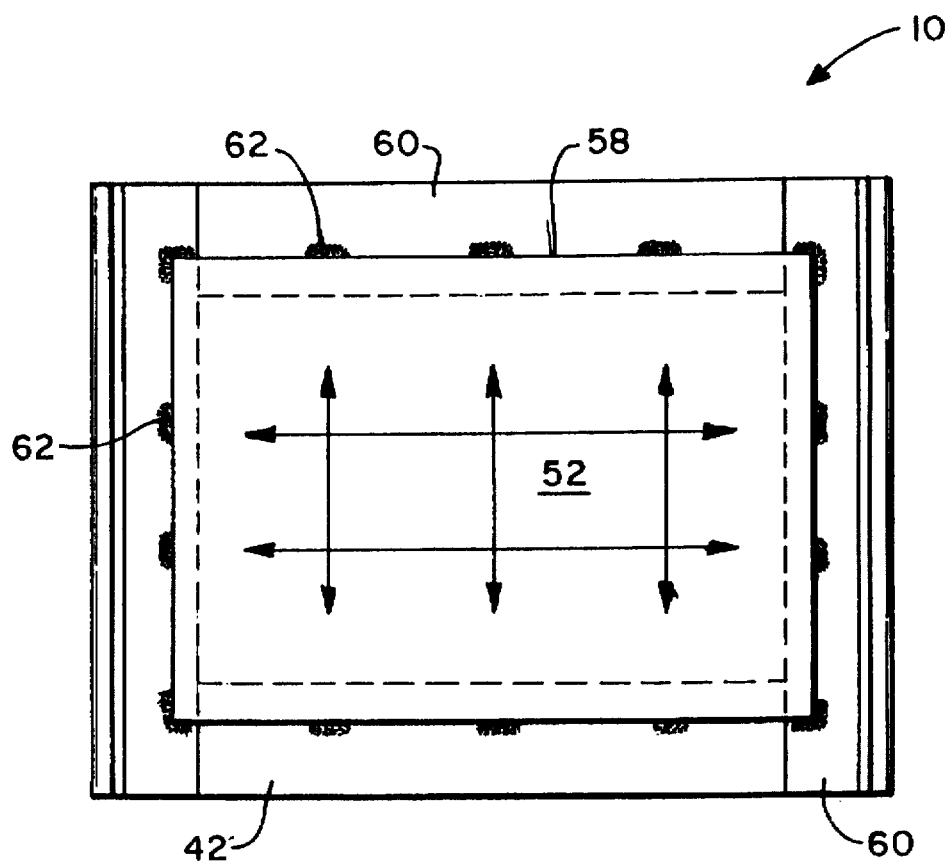
FIG. 6 is a view taken along line 6—6 of FIG. 5, partly in phantom, of the basket cover assembly.

As shown in FIGS. 5 and 6, a basket cover assembly 10 in accordance with the invention comprises a light gauge membrane 52 which is welded to the interior surface 56 of the basket cover 54 along the perimeter 58 of the membrane 52. Preferably, the membrane 52 is composed of the same material as the cover 54 and is centered on the surface 56 of the cover 54. Generally, the outside dimensions of the membrane 52 are smaller than the corresponding outside dimensions of the cover 54 such that a portion 60 of the cover 54 extends beyond the membrane 52 on all sides. A continuous weld or, a skip weld 62 may be used to mount the membrane 52 to the cover 54, however a skip weld 62 is less expensive than a continuous weld. The number and location of the welds 62 are selected such that the perimeter 58 of the membrane 52 remains firmly mounted to the cover 54 under the tension lcad described below and under the maximum force that may be exerted by the heat exchange elements 46.

The welds 62 cause shrinkage of the membrane 52. Since movement of the membrane edges is constrained by the weld 62, such shrinkage places the membrane 52 under tensile stress. When mounted to the basket frame 42, the pre-stressed membrane 52 resists the force exerted by the heat exchange elements 46. Consequently, a cover assembly 10 in accordance with the subject invention does not deform in the manner of conventional covers 44.

Although the membrane 52 contributes additional weight to the basket, such additional weight is much less than the weight attributable to manufacturing the frame components and the cover from heavier gauge materials. Consequently, the total weight of the basket is less than that of conventional baskets which are constructed of heavier material to resist deformation.

It should be appreciated that pre-stressed cover assemblies 10 may be utilized on any side surface which is subject to deformation. For example, a cover assembly 10 in accordance with the invention may be utilized at the inboard end 64 (FIG. 3) of the basket of large rotors wherein the width of the inboard end 64 has become large enough that a cover installed on the inboard end 64 would be subject to deformation. It should be further appreciated that cover assemblies 10 in accordance with the invention also function to close parts of the basket frame 42 which had previously been left open, thereby preventing protrusion of heat exchange elements 46 through such basket frames 42 due to the deformation.

While preferred embodiments have been shown and described, various modifications and substitutions may be made thereto without departing from the spirit and scope of the invention. Accordingly, it is to be understood that the present invention has been described by way of illustration and not limitation.

We claim:

1. A basket cover assembly for use with a heat exchanger basket for a rotary regenerative air preheater, the basket including a frame having a plurality of open sides, said cover assembly comprising:

cover means mountable to the frame for covering one of the sides, said cover means comprising a metallic member having an inside surface;

a metallic membrane comprising at least one edge defining a perimeter, said membrane being mounted to said inside surface of said cover means along said perimeter; and weld means for mounting said membrane to said cover means, wherein said weld means prevents movement of said perimeter relative to said cover means and whereby said weld means imposes a tensile stress on said membrane.

2. The basket cover assembly of claim 1 wherein said cover means and said membrane are composed of the same material.

3. The basket cover assembly of claim 1 wherein said weld means comprises a plurality of spot-welds.

4. The basket cover assembly of claim 1 wherein said weld means comprises a continuous weld.

5. The basket cover assembly of claim 1 wherein said cover means extends beyond said perimeter of said membrane.

6. A basket assembly for a rotary regenerative air preheater comprising:

heat exchange means for providing a heat exchange surface area and a heat storage mass;

basket means for housing said heat exchange means, said basket means having a plurality of open sides;

cover means for covering one of said sides comprising a metallic member having an inside surface;

a metallic membrane defining a perimeter, said membrane being mounted to said inside surface of said cover means along said perimeter; and weld means for mounting said membrane to said cover means, wherein said weld means prevents movement of said perimeter relative to said cover means and whereby said weld means imposes a tensile stress on said membrane.

7. The basket assembly of claim 6 wherein said cover means and said membrane are composed of the same material.

8. The basket cover assembly of claim 7 wherein said weld means comprises a plurality of spot-welds.

9. The basket cover assembly of claim 7 wherein said cover means extends beyond said perimeter of said membrane.

* * * * *